United States Patent
Fukuhara et al.

(10) Patent No.: US 9,505,921 B2
(45) Date of Patent: Nov. 29, 2016

(54) DISPERSION STABILIZER FOR SUSPENSION POLYMERIZATION AND VINYL RESIN PRODUCTION METHOD

(71) Applicant: KURARAY CO., LTD., Kurashiki-shi (JP)

(72) Inventors: Tadahito Fukuhara, Kurashiki (JP); Yosuke Kumaki, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/653,065

(22) PCT Filed: Dec. 26, 2013

(86) PCT No.: PCT/JP2013/084801
§ 371 (c)(1),
(2) Date: Jun. 17, 2015

(87) PCT Pub. No.: WO2014/104160
PCT Pub. Date: Jul. 3, 2014

(65) Prior Publication Data
US 2015/0329713 A1 Nov. 19, 2015

(30) Foreign Application Priority Data

Dec. 28, 2012 (JP) .................. 2012-287746

(51) Int. Cl.
| | |
|---|---|
| C08G 63/48 | (2006.01) |
| C08F 8/00 | (2006.01) |
| C08F 218/02 | (2006.01) |
| C08F 210/00 | (2006.01) |
| C08L 29/04 | (2006.01) |
| C08J 3/00 | (2006.01) |
| C08F 2/20 | (2006.01) |
| C08F 116/06 | (2006.01) |
| C08F 216/06 | (2006.01) |

(52) U.S. Cl.
CPC ............... *C08L 29/04* (2013.01); *C08F 2/20* (2013.01); *C08F 116/06* (2013.01); *C08J 3/00* (2013.01); *C08F 216/06* (2013.01); *C08J 2327/06* (2013.01); *C08L 2205/025* (2013.01); *C08L 2205/03* (2013.01)

(58) Field of Classification Search
CPC ...... C08F 116/06; C08F 2/02; C08F 216/06; C08L 29/04; C08L 27/06; C08L 2205/025; C08L 2205/03; C08J 3/00; C08J 2327/06

USPC .............................. 525/57, 61; 526/330, 348
See application file for complete search history.

(56) References Cited

U.S. PATENT DOCUMENTS

| | | | |
|---|---|---|---|
| 5,349,008 A * | 9/1994 | Takada ..................... | C08F 2/20 524/458 |
| 2003/0008972 A1 | 1/2003 | Kato et al. | |
| 2010/0041828 A1* | 2/2010 | Kato ......................... | C08F 2/20 525/57 |
| 2015/0191558 A1 | 7/2015 | Fukuhara et al. | |

FOREIGN PATENT DOCUMENTS

| | | |
|---|---|---|
| JP | 8 283313 | 10/1996 |
| JP | 10 168128 | 6/1998 |
| JP | 2001 40019 | 2/2001 |
| JP | 2002 97208 | 4/2002 |
| JP | 2002 97209 | 4/2002 |
| JP | 2007 63369 | 3/2007 |
| JP | 2012 1653 | 1/2012 |
| JP | 2012 36327 | 2/2012 |
| WO | 2008 129936 | 10/2008 |

OTHER PUBLICATIONS

U.S. Appl. No. 14/439,868, filed Apr. 30, 2015, Fukuhara, et al.
International Search Report Issued Apr. 15, 2014 in PCT/JP2013/084801 Filed Dec. 26, 2013.

* cited by examiner

*Primary Examiner* — William Cheung
(74) *Attorney, Agent, or Firm* — Oblon, McClelland, Maier & Neustadt, L.L.P.

(57) ABSTRACT

There is provided a dispersion stabilizer for suspension polymerization comprising a vinyl alcohol polymer (A), wherein the vinyl alcohol polymer (A) has a terminal anionic group and has a saponification degree of 30 to 60 mol %, a viscosity average polymerization degree of 650 or less, and a proportion of polymer molecules having a molecular weight of 8000 or less as determined by gel permeation chromatography is 9.5% by mass or less. When a vinyl compound is suspension-polymerized using the dispersion stabilizer for suspension polymerization, its higher polymerization stability allows for providing particles having a uniform size with a less amount of coarse particles, even under the conditions favorable for unstable polymerization.

6 Claims, No Drawings

DISPERSION STABILIZER FOR SUSPENSION POLYMERIZATION AND VINYL RESIN PRODUCTION METHOD

This application is a U.S. National stage application of International Application No. PCT/JP2013/084801, filed on Dec. 26, 2013, which claims priority under 35 U.S.C. Section 119(a) to Japanese Patent Application No. 2012-287746, filed in Japan on Dec. 28, 2012, the entire contents of which are hereby incorporated herein by reference.

TECHNICAL FIELD

The present invention relates to a dispersion stabilizer for suspension polymerization containing a vinyl alcohol polymer (hereinafter, a vinyl alcohol polymer is sometimes referred to as "PVA"). The present invention also relates to a method for producing a vinyl resin wherein a vinyl compound is suspension-polymerized in the presence of the dispersion stabilizer.

BACKGROUND ART

It has been known that a partially saponified vinyl alcohol polymer is used as a dispersion stabilizer for suspension polymerization for a vinyl compound (for example, vinyl chloride).

A partially saponified PVA has, however, low solubility in water, so that handleability is unsatisfactory. Therefore, in order to improve handleability, attempts have been made for improving solubility of a PVA in water, including introduction of a hydrophilic polyoxyalkylene group to a side chain of the PVA or introduction of an ionic group.

For example, there have been proposed the use of a PVA which is of a low polymerization degree and a low saponification degree and contains oxyalkylene groups in side chains (see Patent Reference No. 1), or a PVA having ionic groups (see Patent Reference Nos. 2 and 3).

However, the dispersion stabilizers described in Patent Reference Nos. 1 to 3 are not necessarily satisfactory in terms of required performance; specifically, (1) even with a small amount, polymer particles obtained are highly absorbing a plasticizer and easily processable, (2) remaining monomer components can be easily removed, (3) polymerization stability is so high that a less amount of coarse particles are formed, and so on. In particular, the requirement for removal of monomer components in (2) has been very strict under stricter regulations for the amount of residual monomers in a resin product and so on. Thus, requirements for energy reduction and time reduction are very strong, and a dispersion stabilizer which allows for easy removal of residual monomers from a vinyl chloride polymer is needed. At present, it cannot be said that a dispersion stabilizer successfully satisfying the requirements is provided, including the dispersion stabilizers of Patent Reference Nos. 1 to 3.

PRIOR ART REFERENCES

Patent References

Patent Reference No. 1: JP 2001-040019A
Patent Reference No. 2: JP 2007-063369A
Patent Reference No. 3: JP 1998-168128A

SUMMARY OF THE INVENTION

Problems to be Solved by the Invention

To solve the above problems, an objective of the present invention is to provide a dispersion stabilizer for suspension polymerization, whereby in suspension polymerization of a vinyl compound such as vinyl chloride, polymer particles obtained are highly plasticizer absorbable, a less amount of coarse particles are formed and remaining monomer components can be easily removed, even with a small amount used.

Means for Solving the Problems

The above problems are solved by providing a dispersion stabilizer for suspension polymerization comprising a vinyl alcohol polymer (A), wherein the vinyl alcohol polymer (A) has a terminal anionic group and has a saponification degree of 30 to 60 mol % and a viscosity average polymerization degree of 650 or less, and a proportion of polymer molecules having a molecular weight of 8000 or less as determined by gel permeation chromatography is 9.5% by mass or less.

Herein, it is preferable that the stabilizer further comprises a vinyl alcohol polymer (B) having a saponification degree of 65 mol % or more and a viscosity average polymerization degree of 650 or more. It is also preferable that a mass ratio (A/B) of the vinyl alcohol polymer (A) to the vinyl alcohol polymer (B) is 10/90 to 55/45.

The above problems are also solved by providing a method for producing a vinyl resin, comprising suspension-polymerizing a vinyl compound in the presence of the dispersion stabilizer.

Herein, it is preferable that a polymerization temperature is 56° C. or higher. It is also preferable that a mass ratio of a vinyl compound to water (vinyl compound/water) is 4/7 or more.

Effects of the Invention

When a vinyl compound is suspension-polymerized using the dispersion stabilizer for suspension polymerization of the present invention, its higher polymerization stability allows for providing particles having a uniform size with a less amount of coarse particles, even under the conditions favorable for unstable polymerization. Even with a small amount used, polymer particles obtained are highly plasticizer absorbable and highly processable. Furthermore, polymer particles in which a remaining vinyl compound is significantly removed and which are highly excellent in monomer removability are provided.

Modes for Carrying out the Invention

Dispersion Stabilizer for Suspension Polymerization

A dispersion stabilizer for suspension polymerization of the present invention contains a vinyl alcohol polymer having a particular anionic group (hereinafter, sometimes referred to as "PVA(A)") as described later. The dispersion stabilizer may contain PVA(B) other than PVA(A) and other components within the scope not departing from the spirit of the present invention. There will be detailed individual components.

[PVA(A)]

It is important that PVA(A) used in the present invention has a viscosity average polymerization degree of 650 or less. If a viscosity average polymerization degree of PVA(A) is more than 650, it becomes difficult for monomer components to be removed from vinyl polymer particles obtained by suspension polymerization of a vinyl compound. Furthermore, polymer particles obtained are less plasticizer absorbable. Furthermore, depending on a polymerization degree, PVA(A) cannot be dispersed or dissolved in water, leading to deterioration in handleability. A viscosity average polymerization degree of PVA(A) is preferably 600 or less, more preferably 550 or less. A viscosity average polymerization degree of PVA(A) is preferably 50 or more, more preferably 100 or more.

A viscosity average polymerization degree of PVA(A) is calculated using Nakajima's equation (Akio Nakajima, "Kobunshi Kagaku" (Polymer Chemistry) 6 (1949)) from a limiting viscosity of an acetone solution of a vinyl ester polymer which is produced by substantially completely saponifying PVA(A) followed by acetylization.

It is important that a saponification degree of PVA(A) is 30 to 60 mol % in the light of water dispersibility and performance of a dispersion stabilizer. If a saponification degree of PVA(A) is less than 30 mol %, water dispersibility of PVA(A) is deteriorated, leading to difficulty in handling as a dispersion stabilizer. Furthermore, plasticizer absorbability of polymer particles obtained is deteriorated. A saponification degree of PVA(A) is preferably 33 mol % or more, more preferably 36 mol % or more. If a saponification degree of PVA(A) is more than 60 mol %, monomer components cannot be removed from polymer particles obtained by suspension polymerization of a vinyl compound. Furthermore, plasticizer absorbability of polymer particles obtained is deteriorated. A saponification degree of PVA(A) is preferably 51 mol % or less, more preferably 48 mol % or less. A saponification degree of PVA(A) is as determined in accordance with JIS-K6726.

It is important that in PVA(A), a proportion of polymer molecules having a molecular weight of 8000 or less as determined by gel permeation chromatography is 9.5% by mass or less. If a proportion of the above polymer molecules is more than 9.5% by mass, polymerization stability is so deteriorated that polymer particles obtained may be coarse and particles having a uniform size cannot be obtained. Furthermore, plasticizer absorbability of polymer particles obtained may be deteriorated, monomer components cannot be removed from polymer particles, and shelf stability of an aqueous dispersion of PVA is deteriorated. A proportion of the above polymer molecules is preferably 8.9% by mass or less, more preferably 8.0% by mass or less, further preferably 6.0% by mass or less.

A proportion of the above polymer molecules having a molecular weight of 8000 or less can be adjusted by controlling reaction uniformity of a chain transfer agent used, mainly during polymerization of a vinyl ester monomer. A proportion of the above polymer molecules having a molecular weight of 8000 or less can be reduced by, for example, any of methods (I) to (III) described below.

Method (I): polymerization is performed sequentially while adding a chain transfer agent is added, with stirring for uniformly dispersing the chain transfer agent in the polymerization tank. Specifically, stirring ability, that is, stirring power per a unit volume in polymerization, is increased, and the chain transfer agent is reacted with a vinyl ester monomer while inhibiting uneven reaction of the chain transfer agent depending on a location in the polymerization tank.

Method (II): a rate of polymerization is reduced to increase an overall polymerization degree.

Method (III): after synthesizing a vinyl ester polymer or PVA, it is, for example, washed with a solvent or the like, to remove low-molecular-weight components.

Among the methods (I) to (III), methods (I) and (II) are preferable in the light of production efficiency.

There are no particular restrictions to a stirring power per a unit volume in method (I) described above, and a higher value is preferable. It can be, however, appropriately determined in the light of limitation of facility capacity, increase in a production cost and complexity in production due to foaming or the like which are caused by increasing a stirring power. If a stirring power is too low, the reaction of the chain transfer agent locally proceeds, leading to uneven reaction, a very low polymerization degree of the vinyl ester polymer in the location and a high polymerization degree in the rest. Specifically, it is unfavorable because in comparison with a relatively even reaction, a vinyl ester polymer with a higher rate of a low-molecular-weight fraction may be obtained at a substantially comparable overall polymerization degree.

A stirring power (L) was determined by a common method in accordance with the following equation as described in Masao Ichihara et al., Kagaku Keisan Hou (Chemical Calculation Method) Series 4: Kagakukougaku No Keisan Hou (Chemical Engineering Calculation Method) (1999) and so on.

[Mathematical Formula 1]

$$L[\text{kW}] = (N_p \times \rho \times (n/60)^3 \times d^5)/1000 \quad (1)$$

In the above equation (1), Np represents a power constant; $\rho$ represents a density in the system; n represents a rotation frequency (speed per second); and d represents a diameter of an impeller.

In the above method (II), there are no particular restrictions to a rate of polymerization, but the lower a rate of polymerization is, the lower a proportion of a low-molecular-weight fraction is. However, if a rate of polymerization is too low, increase in a polymerization degree of a vinyl ester polymer may lead to lower performance as a dispersion stabilizer, reduction in a production efficiency due to decrease in a production capacity of the vinyl ester polymer per a unit time, and so on. A rate of polymerization can be appropriately determined in the range of 20 to 95% in the light of a production efficiency and so on.

In the light of stability of an aqueous dispersion, it is preferable that an average particle size of a dispersoid in a 5% by mass aqueous dispersion of PVA(A) at 25° C. is 0.5 µm or less. If the average particle size is more than 0.5 µm, shelf stability of the dispersion may be decreased, causing precipitation of a dispersoid, which leads to difficulty in handling as a dispersion stabilizer.

In the light of performance of a dispersion stabilizer, a block character of residual vinyl esters in PVA(A) is preferably 0.7 or less. If a block character of residual vinyl esters is more than 0.7, it may be difficult to remove monomer components from polymer particles obtained by suspension polymerization of a vinyl compound and plasticizer absorbability of the polymer particles obtained may be reduced. A block character is a value representing a distribution of hydroxy groups generated by saponification of the ester groups and residual ester groups as determined by $^{13}$C-NMR, which is 0 to 2. "0" indicates that ester and hydroxy groups are distributed completely as blocks. As the value increases, alternation increases. "1" indicates that ester and hydroxy groups completely randomly exist. "2" indicates that ester and hydroxy groups completely alternately exist. A block character can be adjusted, depending on the type of a vinyl ester monomer, the saponification conditions such as a catalyst and a solvent, heating after saponification and the like.

There are no particular restrictions to a terminal anionic group in PVA(A), and it can be preferably a carboxyl group, a sulfonic group or a salt thereof. Examples of a carboxyl group or its salt include those having a structure obtained using a thiol represented by any of general formulas (a) to (c) as a chain transfer agent.

[Chemical Formula 1]

$$HS-(CH_2)_p-COOM \quad (a)$$

[Chemical Formula 2]

$$H_3C-(CH_2)_p-\underset{SH}{\overset{H}{C}}-COOM \quad (b)$$

[Chemical Formula 3]

$$HS-\underset{R^1}{\overset{COOM}{C}}-(CH_2)_p-\underset{R^2}{\overset{COOM}{C}}-R^3 \quad (c)$$

In general formulas (a) to (c) above, p represents an integer of 0 to 20; each of $R^1$, $R^2$ and $R^3$ independently represents a hydrogen atom or an optionally substituted alkyl group having 1 to 4 carbon atoms; and M represents a hydrogen atom, an alkali metal ion or an ammonium ion.

Examples of a sulfonic group include those having a structure obtained using a thiol represented by any of general formula (d) to (g) as a chain transfer agent.

[Chemical Formula 4]

$$HS-\underset{H_2}{\overset{R^4}{C}}-\underset{H}{C}-\underset{O}{\overset{\|}{C}}O-(CH_2)_q-SO_3M \quad (d)$$

[Chemical Formula 5]

$$HS-\underset{H_2}{\overset{R^5}{C}}-\underset{H}{C}-\underset{O}{\overset{R^6}{\overset{\|}{C}}}-N-(\underset{R^8}{\overset{R^7}{C}})_q-SO_3M \quad (e)$$

[Chemical Formula 6]

$$HS-\underset{H_2}{\overset{R^9}{C}}-\underset{H}{C}-(\underset{R^{11}}{\overset{R^{10}}{C}})_q-SO_3M \quad (f)$$

[Chemical Formula 7]

$$HS-\underset{H_2}{\overset{R^{12}}{C}}-\underset{H}{C}-\underset{O}{\overset{\|}{C}}-N\underset{(CH_2)_q-SO_3M}{\overset{(CH_2)_q-SO_3M}{\diagup}} \quad (g)$$

In general formulas (d) to (g), q represents an integer of 1 to 4; each of $R^4$ to $R^{12}$ independently represents a methyl group or a hydrogen atom; and M represents a hydrogen atom, an alkali metal ion or an ammonium ion. When q is more than one, $R^7$, $R^8$, $R^{10}$ and $R^{11}$ which occur "q" times can be the same or different.

A terminal anionic group in PVA(A) in the present invention is preferably an anionic group such as a carboxyl group, a sulfonic group and a salt thereof as listed above, more preferably a carboxyl group and its salt. A salt of such an anionic group is more preferably an alkali metal salt in the light of water dispersibility or water solubility of PVA(A).

There are no particular restrictions to a method for producing PVA(A) described above, and a variety of methods can be employed. For example, the following methods (i) and (ii) can be listed.

(i): A vinyl compound is polymerized in the presence of, for example, an alcohol, aldehyde or thiol having a carboxyl or sulfonic group as a chain transfer agent. Then, it is saponified to give PVA(A) having an anionic group.

(ii): An anionic group is introduced to PVA by a chemical reaction.

Method (i) is preferable as a method for more economically and efficiently introducing a terminal anionic group to give an excellent dispersion stabilizer. Specifically, a vinyl ester such as vinyl acetate is preferably polymerized in the presence of a thiol described above, followed by saponification (JP 1982-28121A and JP 1982-105410A).

Examples of a vinyl ester used herein include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate and vinyl benzoate. Among these, vinyl acetate is most preferable.

Another monomer can be copolymerized in synthesis of PVA(A) within the scope not departing from the spirit of the present invention. Examples of a monomer which can be used include α-olefins such as ethylene, propylene, n-butene and isobutylene; acrylamide; acrylamide derivatives such as N-methylacrylamide, N-ethylacrylamide, N,N-dimethylacrylamide, diacetone acrylamide, acrylamide propyldimethylamine and salts or quaternary salts thereof, and N-methylolacrylamide and derivatives thereof; methacrylamide; methacrylamide derivatives such as N-methylmethacrylamide, N-ethylmethacrylamide, methacrylamidepropyldimethylamine and salts or quaternary salts thereof, N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate, 2,3-diacetoxy-1-allyloxypropane and allyl chloride; vinylsilyl compounds such as vinyltrimethoxysilane; and isopropenyl acetate. The amount of copolymerization of another monomer as described above is generally 10 mol % or less.

A temperature of polymerization of a vinyl ester monomer and a chain transfer agent in synthesis of PVA(A) is, but not limited to, preferably 0° C. or higher and 200° C. or lower, more preferably 30° C. or higher and 140° C. or lower. A copolymerization temperature lower than 0° C. is unfavorable because an adequate polymerization rate is not achieved. If a polymerization temperature is higher than 200° C., a desired polymer cannot be obtained. A copolymerization temperature can be controlled to 0° C. or higher and 200° C. or lower by, for example, balancing between exotherm generated from polymerization and heat release from the surface of a reactor by controlling a polymerization rate, or by using an external jacket containing a proper heat medium. The latter method is preferable in the light of safety.

The polymerization described above can be conducted by any polymerization style such as batch polymerization, semi-batch polymerization, continuous polymerization and semi-continuous polymerization. The polymerization method can be any known method such as bulk polymerization, solution polymerization, suspension polymerization and emulsion polymerization. Among these, bulk polymerization or solution polymerization in which polymerization is conducted in a neat system or in the presence of an alcoholic solvent is suitably employed, and for the purpose of producing a polymer with a high polymerization degree, emulsion polymerization is employed. Examples of the alcoholic solvent which is used in bulk polymerization or solution polymerization can include, but not limited to, methanol, ethanol and n-propanol. These solvents can be used in combination of two or more.

An initiator used for the polymerization can be appropriately selected from known azo initiators, peroxide initiators and redox initiators depending on a polymerization method. Examples of an azo initiator include 2,2'-azobisisobutyronitrile, 2,2'-azobis(2,4-dimethylvaleronitrile) and 2,2'-azobis(4-methoxy-2,4-dimethylvaleronitrile); examples of a peroxide initiator include percarbonates such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetylcyclohexylsulfonyl peroxide; and 2,4,4-trimethylpentyl-2-peroxyphenoxy acetate. Furthermore, the above initiator can be combined with, for example, ammonium persulfate or hydrogen peroxide, to be an initiator. Furthermore, a redox initiator can be a combination of the above peroxide with a reducing agent such as sodium bisulfite, sodium bicarbonate, tartaric acid, L-ascorbic acid and Rongalite.

When the polymerization is conducted at a high temperature, PVA may be stained due to decomposition of a vinyl ester monomer. Thus, in such a case, it is allowed to add an antioxidizing agent such as tartaric acid to the polymerization system in an amount of about 1 ppm or more and 100 ppm or less for preventing staining.

For the purpose of adjusting a polymerization degree of a vinyl ester polymer obtained in the polymerization, the polymerization can be conducted in the presence of another chain transfer agent. The amount of the chain transfer agent can be determined, depending on a chain transfer constant of a chain transfer agent added and a polymerization degree of the desired vinyl ester polymer. In general, it is desirably 0.1% by mass or more and 10% by mass or less based on the vinyl ester monomers.

A stirring blade used in the polymerization can be an appropriate stirring blade including, but not limited to, anchor type, paddle type, bister type and Maxblend type stirring blades. A chain transfer agent used can be evenly reacted using a Maxblend blade highly capable of stirring a solution or appropriately adjusting a rotation frequency of a stirring blade or stirring, to give a sharp molecular weight distribution of a vinyl ester polymer obtained and to reduce a proportion of a low-molecular-weight fraction, whereby performance of a dispersion stabilizer of the present invention can be improved. Polymerization is preferably conducted at such a polymerization temperature that a life of an initiator is reduced, and a polymerization type is preferably continuous polymerization.

For saponification of a vinyl ester polymer, well-known alcoholysis or hydrolysis using a basic catalyst such as sodium hydroxide, potassium hydroxide and sodium methoxide or an acidic catalyst such as p-toluenesulfonic acid, hydrochloric acid, sulfonic acid and nitric acid can be employed. Examples of a solvent which can be used in such a reaction include alcohols such as methanol and ethanol; esters such as methyl acetate and ethyl acetate; ketones such as acetone and methyl ethyl ketone; and aromatic hydrocarbons such as benzene and toluene, which can be used alone or in combination of two or more. Particularly, it is convenient and preferable that the saponification is effected using methanol or a mixed solution of methanol/methyl acetate as a solvent and sodium hydroxide as a catalyst. A concentration of the vinyl ester polymer in an alcohol can be selected within the range of, but not limited to, 10 to 80% by mass. The amount of an alkali or acid is adjusted, taking a target saponification degree into consideration, and is preferably 1 to 100 mmol equivalent based on the vinyl ester polymer in the light of preventing staining of PVA and reducing the amount of sodium acetate. In the saponification using an alkali, when a terminal functional group introduced in the vinyl ester polymer is an alkali-consuming group such as an acid group, the saponification can be conducted with using a more amount of the alkali than the above range by the amount consumed. A saponification temperature is, but not limited to, 10° C. to 70° C., preferably 30° C. to 40° C. A reaction time is, but not limited to, about 30 min to 5 hours.

[PVA(B)]

A dispersion stabilizer of the present invention preferably further contains, in addition to PVA(A), PVA(B) with a saponification degree of 65 mol % or more and a viscosity average polymerization degree of 650 or more. Thus, by combining PVA(B) having a higher viscosity-average polymerization degree and a higher saponification degree than PVA(A), polymerization stability is improved, resulting in inhibition of formation of coarse particles.

A saponification degree of PVA(B) used in the present invention is preferably 65 mol % or more. If a saponification degree is less than 65 mol %, a water solubility of PVA(B) may be so reduced that handleability is deteriorated. A saponification degree of PVA(B) is more preferably 70 mol % or more. A saponification degree of PVA(B) is more preferably 95 mol % or less, further preferably 90 mol % or less. A saponification degree of PVA(B) is a value determined in accordance with JIS K6726.

A viscosity average polymerization degree of PVA(B) is preferably 650 or more. If a viscosity average polymerization degree of PVA(B) is less than 650, polymerization stability in suspension polymerization of a vinyl compound may be lowered. A viscosity average polymerization degree of PVA(B) is more preferably 8000 or less, further preferably 3500 or less. A viscosity average polymerization degree of PVA(B) can be calculated as described for PVA(A).

When PVA(A) and PVA(B) are combined in the present invention, there are no particular restrictions to a mass of PVA(A) or PVA(B), but a mass ratio (A/B) of PVA(A) to PVA(B) is preferably 10/90 to 55/45. If a proportion of PVA(A) is less than 10% by mass, performance of a dispersion stabilizer may be deteriorated; for example, removal of monomer components from polymer particles obtained by suspension polymerization may be difficult or plasticizer absorbability of the polymer particles obtained may be reduced. If a proportion of PVA(A) more than 55% by mass, it may adversely affect polymerization.

In a dispersion stabilizer of the present invention, PVA(B) may be used alone or in combination of two or more having different properties.

[Other Components]

A dispersion stabilizer of the present invention can contain various additives without departing from the scope of the present invention. Examples of such additives include a polymerization regulator such as aldehydes, halogenated hydrocarbons and mercaptans; a polymerization inhibitor such as phenol compounds, sulfur-containing compounds and N-oxides; a pH regulator; a cross-linker; a preservative; a mildew-proofing agent; an anti-blocking agent; and a defoamer.

[Utilities]

A suitable application of a dispersion stabilizer of the present invention is production of a vinyl resin by suspension polymerization of a vinyl compound in the presence of the dispersion stabilizer. Examples of such vinyl compounds include vinyl halides such as vinyl chloride; vinyl esters such as vinyl acetate and vinyl propionate; acrylic acid, methacrylic acid and their esters and salts; maleic acid, fumaric acid and their esters and anhydrides; styrene, acrylonitrile, vinylidene chloride and vinyl ethers. Among these, a dispersion stabilizer of the present invention is used particularly suitably in suspension polymerization of vinyl chloride alone or in combination with a monomer capable of being co-polymerized with vinyl chloride. Examples of a monomer capable of being co-polymerized with vinyl chloride include vinyl esters such as vinyl acetate and vinyl propionate; (meth)acrylic acid esters such as methyl (meth) acrylate and (meth)acrylate ethyl; α-olefins such as ethylene and propylene; unsaturated dicarboxylic acids such as maleic anhydride and itaconic acid; acrylonitrile, styrene, vinylidene chloride and vinyl ethers.

In suspension polymerization of vinyl compounds, an oil-soluble or water-soluble polymerization initiator which is conventionally used in polymerization such as vinyl chloride monomer, can be used. Examples of an oil-soluble polymerization initiator include percarbonate compounds such as diisopropyl peroxydicarbonate, di-2-ethylhexyl peroxydicarbonate and diethoxyethyl peroxydicarbonate; perester compounds such as t-butyl peroxyneodecanate, t-butyl peroxypivalate, t-hexyl peroxypivalate and α-cumyl peroxyneodecanate; peroxides such as acetyl cyclohexylsulfonyl peroxide, 2,4,4-trimethylpentyl-2-peroxyphenoxy acetate, 3,5,5-trimethylhexanoyl peroxide and lauroyl peroxide; and azo compounds such as azobis-2,4-dimethylvaleronitrile and azobis(4-2,4-dimethylvaleronitrile). Examples of a water-soluble polymerization initiator include potassium persulfate, ammonium persulfate, hydrogen peroxide and cumene hydroperoxide. These oil-soluble or water-soluble polymerization initiators can be used alone or in combination of two or more.

There are no particular restrictions to a polymerization temperature during suspension polymerization of vinyl compounds, and it can be, of course, as low as about 20° C., or can be controlled to an elevated temperature higher than 90° C. Furthermore, it is also a preferable embodiment that a polymerization reactor equipped with a reflux condenser is used for improving a heat removal efficiency of the polymerization reaction system.

In suspension polymerization of a vinyl compound, a polymerization degree of polymer particles obtained can be controlled by controlling a polymerization temperature, but if a polymerization temperature is increased, removal of residual monomer components in the polymer particles obtained is difficult and a polymerization reaction is unstable. In contrast, by producing a vinyl resin using a dispersion stabilizer of the present invention, monomer components can be easily removed from polymer particles even at a higher polymerization temperature and polymerization stability can be prominently improved. Therefore, the use of a dispersion stabilizer of the present invention is particularly effective at a polymerization temperature of 56° C. or higher.

When a vinyl polymer is produced using a dispersion stabilizer of the present invention, a mass ratio of a vinyl compound to water (vinyl compound/water) is preferably 4/7 or more. If a mass ratio (vinyl compound/water) is less than 4/7, a productivity of a vinyl polymer may be lowered. A mass ratio (vinyl compound/water) is preferably 3/4 or more. Thus, a dispersion stabilizer of the present invention is preferably used under the conditions that a ratio of the vinyl compound to water is higher to some extent and polymerization tends to be unstable, because the stabilizer is more effective in terms of polymerization stability. A higher ratio of the vinyl compound to water leads to a higher productivity, but polymerization becomes unstable. Therefore, the mass ratio the mass ratio (vinyl compound/water) is generally 5/4 or less, preferably 10/9 or less.

A dispersion stabilizer for suspension polymerization of the present invention can be used alone or in combination with a water-soluble cellulose ether such as methylcellulose, hydroxyethylcellulose, hydroxypropylcellulose and hydroxypropylmethylcellulose; a water-soluble polymer such as gelatin; an oil-soluble emulsifier such as sorbitan monolaurate, sorbitan trioleate, glycerin tristearate and ethylene oxide-propylene oxide block copolymer; and/or a water-soluble emulsifier such as polyoxyethylene sorbitane monolaurate, polyoxyethylene glycerin oleate and sodium laurate, and the like, which are used for suspension polymerization of a vinyl compound in an aqueous medium. The amount of these is preferably, but not limited to, 0.01 parts by mass or more and 1.0 parts by mass or less per 100 parts by mass of the vinyl compound.

EXAMPLES

The present invention will be further detailed with reference to Examples. In Examples and Comparative Examples below, "part(s)" and "%" denote, unless otherwise stated, part(s) by mass and % by mass, respectively.

PVA(A) and PVA(B) produced by the production examples below were evaluated by the following methods.

[Viscosity Average Polymerization Degree of PVA]

A viscosity average polymerization degree of PVA(A) was calculated using Nakajima's equation (Akio Nakajima, "Kobunshi Kagaku" (Polymer Chemistry) 6 (1949)) from a limiting viscosity of an acetone solution of a vinyl ester polymer which was produced by substantially completely saponifying PVA(A) followed by acetylization.

[Saponification Degree of PVA]

A saponification degree of PVA was determined in accordance with the method described in JIS-K6726.

[Proportion of a Low-Molecular-Weight Fraction and Molecular Weight Distribution of PVA ($Mw_{PVA}/Mn_{PVA}$)]

A proportion of polymer molecules having a molecular weight of 8000 or less in PVA and a molecular weight distribution ($Mw_{PVA}/Mn_{PVA}$) were determined by gel permeation chromatography (GPC).

Column: GMHHR-H(S)×2
Mobile phase: HFIP+20 mM $CF_3COONa$
Measurement temperature: 40° C.
Standard: PMMA

[Molecular Weight Distribution of PVAc ($Mw_{PVA}/Mn_{PVAc}$)]

A sample PVA was substantially completely saponified and then acetylated to give a vinyl ester polymer. The vinyl ester polymer thus obtained was subjected to GPC measurement. Measurement devices and measurement conditions are as follows.
Column: KF-806L
Mobile phase: THF
Measurement temperature: 23° C.
Standard: polystyrene
[Water Solubility of PVA]
To 95 parts of water was added 5 parts of PVA, and the mixture was stirred at room temperature for 4 hrs. After stopping stirring, the presence of precipitation was visually observed and was evaluated according to the following criteria.
A: Precipitation was not observed and a clean solution or dispersion was obtained.
B: Precipitation was observed.

Production Example 1

Production of PVA(A1)

In a polymerization tank were charged 1387 parts of vinyl acetate (hereinafter, abbreviated as "VAc"), 315 parts of methanol and 8.61 parts of 3-mercaptopropionic acid (hereinafter, abbreviated as "3-MPA") as a chain transfer agent, and after nitrogen substitution, the mixture was heated to its boiling point. Then, to the mixture was added 2,2'-azobis (4-methoxy-2,4-dimethylvaleronitrile) as a polymerization initiator in an amount of 0.02% based on VAc. Addition of 3-MPA and the initiator was continued such that concentrations of 3-MPA and the initiator in the polymerization tank is kept at 0.62% and 0.02%, respectively, based on a concentration of VAc. Polymerization was conducted at a rotation frequency of 70 rpm using a Maxblend blade as a stirring blade. At the time that a rate of polymerization reached 62%, periodic addition of VAc and methanol was initiated such that a ratio of unreacted VAc to methanol at that point was kept, while addition of 3-MPA and the initiator was continued. At the same time, removal of the content of the polymerization tank in an amount corresponding to the added amount out of the system was initiated while a rate of polymerization in the system was kept at 62%. While adding methanol, residual VAc together with methanol was expelled from the removed content to give a solution of a polyvinyl acetate polymer (hereinafter, abbreviated as "PVAc") in methanol (concentration: 63%). Subsequently, PVAc was conventionally saponified using sodium hydroxide, neutralized with water and dried, to give PVA(A1) with a viscosity average polymerization degree of 260, a saponification degree of 40 mol % and a proportion of a low-molecular-weight fraction (a proportion of polymer molecules having a molecular weight of 8000 or less) of 4.4% by mass.

Production Examples 2 to 14

Production of PVA(A2 to 14)

PVAs (A2 to 14) shown in Table 1 were produced as described in Production Example 1, changing polymerization conditions including the amounts of vinyl acetate and methanol; the type, the amount and an in-system concentration based on VAc of a chain transfer agent used in polymerization; an in-system concentration of a polymerization initiator based on VAc; a rate of polymerization; the type of a stirring blade; and a rotation frequency in stirring. Table 1 shows the production conditions and the physical properties of PVA(A)s produced, and Tables 2 and 3 show chain transfer agents and stirring blades used, respectively.

Production Example 15

Production of PVA(A15)

In a polymerization tank were charged 391 parts of VAc and 1311 parts of methanol, and after nitrogen substitution, the mixture was heated to its boiling point. Then, to the mixture was added azobisisobutyronitrile as a polymerization initiator in an amount of 0.3% based on VAc. Polymerization was conducted without adding a chain transfer agent at a rotation frequency of 100 rpm, using an anchor blade as a stirring blade. At the point that a rate of polymerization reached 62%, the system was cooled to terminate the polymerization. While adding methanol, residual VAc together with methanol was expelled under reduced pressure, to give a solution of PVAc in methanol (concentration: 60%). Then, PVAc was conventionally saponified using sodium hydroxide, neutralized with water and dried, to PVA(A15) with no terminal anionic groups with a viscosity average polymerization degree of 250, a saponification degree of 40 mol % and a proportion of low-molecular-weight fraction (a proportion of the polymer molecules having a molecular weight of 8000 or less) of 4.7% by mass.

TABLE 1

| | | Charge | | | | | Polymerization initiator | Polymerization |
|---|---|---|---|---|---|---|---|---|
| | | | | | Chain transfer agent | | | |
| | PVA(A) | Vinyl acetate (part) | Methanol (part) | Type | Charge (part) | Concentration (% by mass/VAc) | (% by mass/VAc) | rate (%) |
| Production Example 1 | PVA(A1) | 1387 | 315 | A | 8.61 | 0.62 | 0.02 | 62 |
| Production Example 2 | PVA(A2) | 1505 | 197 | A | 2.65 | 0.18 | 0.004 | 40 |
| Production Example 3 | PVA(A3) | 1387 | 315 | A | 8.61 | 0.62 | 0.02 | 62 |
| Production Example 4 | PVA(A4) | 1387 | 315 | A | 8.61 | 0.62 | 0.02 | 62 |
| Production Example 5 | PVA(A5) | 1387 | 315 | B | 13.61 | 0.98 | 0.02 | 62 |
| Production Example 6 | PVA(A6) | 1387 | 315 | C | 14.44 | 1.04 | 0.014 | 62 |
| Production Example 7 | PVA(A7) | 1387 | 315 | A | 9.17 | 0.66 | 0.02 | 62 |
| Production Example 8 | PVA(A8) | 1387 | 315 | A | 10.15 | 0.73 | 0.02 | 62 |
| Production Example 9 | PVA(A9) | 1532 | 170 | A | 0.57 | 0.04 | 0.008 | 30 |
| Production Example 10 | PVA(A10) | 1387 | 315 | A | 8.61 | 0.62 | 0.02 | 62 |
| Production Example 11 | PVA(A11) | 1387 | 315 | A | 8.61 | 0.62 | 0.02 | 62 |
| Production Example 12 | PVA(A12) | 1387 | 315 | D | 6.34 | 0.46 | 0.02 | 62 |

TABLE 1-continued

| | | | | | | | | |
|---|---|---|---|---|---|---|---|---|
| Production Example 13 | PVA(A13) | 1387 | 315 | A | 11.44 | 0.80 | 0.02 | 62 |
| Production Example 14 | PVA(A14) | 1387 | 315 | A | 7.6 | 0.55 | 0.01 | 62 |
| Production Example 15 | PVA(A15) | 391 | 1311 | — | — | — | 0.3 | 62 |

| | Stirring | | Physical properties of PVA(A) | | | | | |
|---|---|---|---|---|---|---|---|---|
| | Stirring blade | Stirring power per a unit volume (kW/m3) | Viscosity average polymerization degree | Saponification degree (mol %) | Proportion of low-molecular-weightfraction (% by mass) | Block character | $Mw_{PVA}/Mn_{PVA}$ | $Mw_{PVAc}/Mn_{PVAc}$ |
| Production Example 1 | A | 1.43 | 260 | 40 | 4.4 | 0.442 | 2.22 | 1.91 |
| Production Example 2 | A | 1.00 | 500 | 40 | 1.2 | 0.440 | 2.19 | 1.92 |
| Production Example 3 | A | 1.43 | 260 | 35 | 4.4 | 0.444 | 2.22 | 1.91 |
| Production Example 4 | A | 1.43 | 260 | 52 | 4.4 | 0.439 | 2.23 | 1.93 |
| Production Example 5 | A | 1.43 | 250 | 40 | 4.6 | 0.434 | 2.31 | 1.94 |
| Production Example 6 | A | 1.43 | 240 | 40 | 4.9 | 0.448 | 2.54 | 1.96 |
| Production Example 7 | A | 0.66 | 250 | 40 | 6.5 | 0.438 | 2.63 | 1.97 |
| Production Example 8 | B | 0.10 | 270 | 40 | 8.1 | 0.441 | 2.69 | 1.97 |
| Production Example 9 | A | 0.80 | 800 | 40 | 0.4 | 0.449 | 2.21 | 1.90 |
| Production Example 10 | A | 1.43 | 260 | 25 | 4.4 | 0.437 | 2.24 | 1.90 |
| Production Example 11 | A | 1.43 | 260 | 70 | 4.4 | 0.440 | 2.23 | 1.91 |
| Production Example 12 | A | 1.43 | 270 | 40 | 4.3 | 0.444 | 2.22 | 1.91 |
| Production Example 13 | B | 0.01 | 240 | 40 | 10.1 | 0.437 | 3.64 | 2.05 |
| Production Example 14 | B | 0.01 | 350 | 40 | 9.7 | 0.444 | 3.52 | 2.02 |
| Production Example 15 | C | 0.68 | 250 | 40 | 4.7 | 0.449 | 2.34 | 1.94 |

TABLE 2

| Type | Chain transfer agent |
|---|---|
| A | 3-Mercaptopropionic acid |
| B | Mercaptosuccinic acid |
| C | Sodium 3-mercapto-1-propanesulfonate |
| D | 2-Mercaptoethanol |

TABLE 3

| Type | Stirring blade |
|---|---|
| A | Maxblend blade |
| B | Bister type |
| C | Anchor blade |

Example 1

In a 5 liter autoclave were charged PVA(B) obtained by saponifying a homopolymer of VAc with a viscosity average polymerization degree of 2000 and a saponification degree of 80 mol % in an amount of 800 ppm based on vinyl chloride monomer as a solution in 100 parts of deionized water, the PVA(A1) in an amount of 200 ppm based on vinyl chloride monomer as a solution in 100 parts of water, and additional deionized water in such an amount that the total amount of deionized water charged was to be 1200 parts. Next, in the autoclave were charged 0.65 parts of a 70% solution of cumyl peroxyneodecanate in toluene and 1.05 parts of a 70% solution of t-butyl peroxyneododecanate in toluene. Nitrogen was introduced to a pressure of the autoclave of 0.2 MPa and purged, and the process was repeated five times in total, to fully substitute the atmosphere of the autoclave with nitrogen for removing oxygen. Then, 940 parts of vinyl chloride was charged, and the content in the autoclave was heated to 57° C. with stirring to initiate polymerization of vinyl chloride monomer. A pressure in the autoclave at the beginning of polymerization was 0.80 MPa. At the point that a pressure in the autoclave became 0.70 MPa about 3.5 hours after the initiation of polymerization, polymerization was terminated. After removing the unreacted vinyl chloride monomer, the polymerization product was collected and dried at 65° C. for 16 hours, to give vinyl chloride polymer particles.

(Evaluation of Vinyl Chloride Polymer Particles)

The polymer particles produced in Example 1 was evaluated for (1) an average particles size, (2) a particle size distribution, (3) a plasticizer absorbency and (4) residual monomer amount (monomer removability) as described below. The evaluation results are shown in Table 4.

(1) Average Particle Size

A particle size distribution was measured by dry-sieve analysis using a metal mesh on the Tyler mesh scale, to determine an average particle size of the polymer particles.

(2) Particle Size Distribution

A content of JIS standard sieve 42 mesh-on was given in % by mass.

A: less than 0.5% by mass

B: 0.5% by mass or more and less than 1% by mass

C: 1% by mass or more

A content of JIS standard sieve 60 mesh-on was given in % by mass.

A: less than 5% by mass

B: 5% by mass or more and less than 10% by mass

C: 10% by mass or more

It is indicated that the smaller both contents of 42 mesh-on and of 60 mesh-on are, the less coarse particles are and the sharper a particle size distribution is, and thus the more stable polymerization is.

(3) Plasticizer Absorbency

A 5 mL syringe filled with 0.02 g of absorbent cotton was weighed (A g). To the syringe was added 0.5 g of the vinyl chloride polymer particles obtained, and the syringe was weighed (B g). To the syringe was added 1 g of dioctyl phthalate (DOP). After standing for 15 min, it was centrifuged at 3000 rpm for 40 min, and then was weighed (C g). Then, a plasticizer absorbency (%) was determined from the calculating formula below.

$$\text{Plasticizer absorbency (\%)} = 100 \times [\{(C-A)/(B-A)\}-1]$$

(4) Residual Monomer Amount (Monomer Removability)

A polymerization product in suspension polymerization of vinyl chloride was collected, dried at 75° C. for hours, at which the amount of residual monomers was measured by head-space gas chromatography. A smaller value means that a more proportion of residual monomers in vinyl chloride polymer particles was removed by drying. Therefore, this value can be an indicator of ease of removing residual monomers, that is, monomer removability.

Examples 2 to 8

Suspension polymerization of vinyl chloride was conducted to produce vinyl chloride polymer particles as described in Example 1, except that each of PVAs (A2 to 8) was used. The evaluation results of the polymer particles obtained are shown in Table 4.

Example 9

Vinyl chloride polymer particles were produced by suspension polymerization of vinyl chloride as described in Example 1 except that the total of deionized water charged was 1400 parts. Evaluation results for the polymer particles obtained are shown in Table 5.

Example 10

Vinyl chloride polymer particles were produced by suspension polymerization of vinyl chloride as described in Example 1 except that a polymerization temperature was 50° C.; 1.2 parts of a 70% solution of cumyl peroxyneodecanoate in toluene and 2.0 parts of a 70% solution of t-butyl peroxyneodododecanate in toluene were used as a polymerization initiator; a pressure in the autoclave at the beginning of polymerization was 0.72 MPa; and the polymerization was terminated about 5 hours after the initiation of polymerization at which a pressure in the autoclave reached 0.60 MPa. Evaluation results for the polymer particles obtained are shown in Table 6.

Comparative Example 1

Vinyl chloride polymer particles were produced by suspension polymerization of vinyl chloride as described in Example 1, in the absence of PVA(A1). Evaluation results for the polymer particles are shown in Table 4. Plasticizer absorbability of the polymer particles obtained was inadequate. Furthermore, the residual monomer amount was large and thus monomer removability was unsatisfactory.

Comparative Example 2

Although PVA(A9) with a viscosity average polymerization degree of 800 was substituted for PVA(A1), the PVA (A9) was not dissolved or dispersed in water probably due to its high polymerization degree, leading to failure to be evaluated.

Comparative Example 3

Vinyl chloride polymer particles were produced by suspension polymerization of vinyl chloride as described in Example 1, substituting PVA(A10) with a saponification degree of 25 mol % for PVA(A1). Evaluation results of the vinyl chloride polymer particles are shown in Table 4. Plasticizer absorbability of the polymer particles obtained was inadequate. Furthermore, the residual monomer amount was large and thus monomer removability was unsatisfactory.

Comparative Example 4

Vinyl chloride polymer particles were produced by suspension polymerization of vinyl chloride as described in Example 1, substituting PVA(A11) with a saponification degree of 70 mol % for PVA(A1). Evaluation results of the vinyl chloride polymer particles are shown in Table 4. Plasticizer absorbability of the polymer particles obtained was inadequate. Furthermore, the residual monomer amount was large and thus monomer removability was unsatisfactory.

Comparative Example 5

Although as a chain transfer agent, PVA(A12) synthesized using 2-mercaptoethanol was used in place of PVA (A1), the PVA(A12) was not dissolved or dispersed in water probably due to absence of an anionic group, leading to failure to be evaluated.

Comparative Example 6

Suspension polymerization of vinyl chloride was conducted as described in Example 1, substituting PVA(A13) with a proportion of a low-molecular-weight fraction having a molecular weight of 8000 or less of 10.1%, for PVA(A1). Evaluation results of the vinyl chloride polymer particles are shown in Table 4. In the polymer particles obtained, the residual monomer amount was large and thus monomer removability was unsatisfactory. Furthermore, an average particle size was particularly large and many coarse particles were observed, indicating unsatisfactory polymerization stability.

Comparative Example 7

Suspension polymerization of vinyl chloride was conducted as described in Example 1, substituting PVA(A14) with a proportion of a low-molecular-weight fraction having a molecular weight of 8000 or less of 9.7% and a viscosity average polymerization degree of 350, for PVA(A1). Evaluation results of the vinyl chloride polymer particles are shown in Table 4. In the polymer particles obtained, the residual monomer amount was large and thus monomer removability was unsatisfactory. Furthermore, an average particle size was particularly large and many coarse particles were observed, indicating unsatisfactory polymerization stability.

Comparative Example 8

Although PVA(A15) which was an unmodified PVA synthesized without using a chain transfer agent was used in place of PVA(A1), the PVA(A15) was not dissolved or dispersed in water probably due to absence of an anionic group, leading to failure to be evaluated.

Comparative Example 9

Vinyl chloride polymer particles were produced by suspension polymerization of vinyl chloride as described in Comparative Example 6, except that the total amount of deionized water charged was 1400 parts. Evaluation results of the vinyl chloride polymer are shown in Table 5. In the polymer particles obtained, the residual monomer amount was large and thus monomer removability was unsatisfactory. Furthermore, an average particle size was large and many coarse particles were observed.

Comparative Example 10

Vinyl chloride polymer particles were produced by suspension polymerization of vinyl chloride as described in Comparative Example 6, except that a polymerization temperature was 50° C.; 1.2 parts of a 70% solution of cumyl peroxyneodecanoate in toluene and 2.0 parts of a 70% solution of t-butyl peroxyneododecanate in toluene were used as an initiator; a pressure in the autoclave at the beginning of polymerization was 0.72 MPa; and the polymerization was terminated about 5 hours after the initiation of polymerization at which a pressure in the autoclave reached 0.60 MPa. Evaluation results of the polymer particles obtained are shown in Table 6. An average particle size was large and many coarse particles were observed.

TABLE 4

| | | | Evaluation results of vinyl chloride polymer particles | | | | |
|---|---|---|---|---|---|---|---|
| | | | Average particle | Particle size distribution | | Plasticizer | Residual monomer |
| | PVA(A) | Solubility of PVA | size (μm) | 42 mesh-on | 60 mesh-on | absorbability (%) | amount (ppm) |
| Example 1 | PVA(A1) | A | 155.3 | A | | 20.2 | 0.3 |
| Example 2 | PVA(A2) | A | 154.8 | A | A | 20.9 | 0.5 |
| Example 3 | PVA(A3) | A | 166.8 | A | A | 20.6 | 0.5 |
| Example 4 | PVA(A4) | A | 154.4 | A | A | 20.0 | 0.9 |
| Example 5 | PVA(A5) | A | 166.6 | A | A | 20.7 | 0.8 |
| Example 6 | PVA(A6) | A | 173.2 | A | B | 22.4 | 0.9 |
| Example 7 | PVA(A7) | A | 157.0 | A | A | 20.4 | 0.6 |
| Example 8 | PVA(A8) | A | 172.6 | A | B | 21.2 | 0.8 |
| Comparative Example 1 | — | A | 147.3 | B | A | 11.3 | 436.0 |
| Comparative Example 2 | PVA(A9) | B | — | — | — | — | — |
| Comparative Example 3 | PVA(A10) | A | 153.4 | A | A | 16.7 | 19.9 |
| Comparative Example 4 | PVA(A11) | A | 150.5 | B | A | 15.3 | 159.5 |
| Comparative Example 5 | PVA(A12) | B | — | — | — | — | — |
| Comparative Example 6 | PVA(A13) | A | 225.6 | C | C | 19.9 | 2.3 |
| Comparative Example 7 | PVA(A14) | A | 201.2 | C | C | 19.8 | 2.1 |
| Comparative Example 8 | PVA(A15) | B | — | — | — | — | — |

As shown in Table 4, polymer particles having a uniform size with less coarse particles being formed can be produced by suspension polymerization of a vinyl compound using a dispersion stabilizer for suspension polymerization containing PVA(A) in accordance with the present invention because of higher polymerization stability. Furthermore, polymer particles which are excellent in plasticizer absorbability and monomer removability can be provided. A dispersion stabilizer of the present invention is, therefore, industrially very useful.

TABLE 5

| | | | Evaluation results of vinyl chloride polymer particles | | | | |
|---|---|---|---|---|---|---|---|
| | | | Average | Particle size distribution | | Plasticizer | Residual monomer |
| | PVA(A) | Vinyl chloride monomer/water | particle size (μm) | 42 mesh-on | 60 mesh-on | absorbability (%) | amount (ppm) |
| Example 1 | PVA(A1) | 940/1200 | 155.3 | A | A | 20.2 | 0.3 |
| Example 9 | PVA(A1) | 940/1400 | 151.4 | A | A | 20.0 | 0.3 |
| Comparative Example 6 | PVA(A13) | 940/1200 | 225.6 | C | C | 19.9 | 2.3 |
| Comparative Example 9 | PVA(A13) | 940/1400 | 190.7 | B | C | 19.6 | 2.2 |

In suspension polymerization of a vinyl compound, a higher ratio of the vinyl compound to water leads to a higher productivity. However, as shown in Comparative Examples 6 and 9 in Table 5, a higher ratio of the vinyl compound to water may increase formation of coarse particles and polymerization reaction may tend to be unstable. In contrast, as shown in Examples 1 and 9, the use of PVA(A1) as a dispersion stabilizer allowed for producing polymer particles having a uniform particle size with less coarse particles being formed, even with a higher ratio of the vinyl compound to water. Therefore, under the polymerization conditions where a ratio of the vinyl compound is high, the use of a dispersion stabilizer of the present invention is very effective.

TABLE 6

|  | PVA(A) | Polymerization temperature (° C.) | Evaluation results of vinyl chloride polymer particles | | | | |
|---|---|---|---|---|---|---|---|
|  |  |  | Average particle size (μm) | Particle size distribution | | Plasticizer absorbability (%) | Residual monomer amount (ppm) |
|  |  |  |  | 42 mesh-on | 60 mesh-on |  |  |
| Example 1 | PVA(A1) | 57 | 155.3 | A | A | 20.2 | 0.3 |
| Example 10 | PVA(A1) | 50 | 140.4 | A | A | 25.9 | 0.1 |
| Comparative Example 6 | PVA(A13) | 57 | 225.6 | C | C | 19.9 | 2.3 |
| Comparative Example 10 | PVA(A13) | 50 | 182.7 | B | C | 25.1 | 1.2 |

In suspension polymerization of a vinyl compound, a polymerization degree of the polymer particles obtained can be controlled. However, as shown in Comparative Examples 6 and 10 in Table 6, a polymerization temperature of 57° C. instead of 50° C. increased formation of coarse particles. Furthermore, plasticizer absorbability and monomer removability were unsatisfactory. In contrast, as shown in Examples 1 and 10, the use of PVA(A1) allowed for producing polymer particles having a uniform particle size with less coarse particles being formed, even at a polymerization temperature of 57° C. instead of 50° C. Furthermore, plasticizer absorbability and monomer removability were excellent. Therefore, under the polymerization conditions where a polymerization temperature is high, the use of a dispersion stabilizer of the present invention is very effective.

The invention claimed is:

1. A dispersion stabilizer comprising a vinyl alcohol polymer (A), wherein
the vinyl alcohol polymer (A) has an anionic group only at polymer chain terminals and has a saponification degree of 30 to 60 mol % and a viscosity average polymerization degree of 650 or less, and a proportion of polymer molecules having a molecular weight of 8000 or less as determined by gel permeation chromatography is 9.5% by mass or less.

2. The dispersion stabilizer as claimed in claim 1, further comprising a vinyl alcohol polymer (B) having a saponification degree of 65 mol % or more and a viscosity average polymerization degree of 650 or more.

3. The dispersion stabilizer as claimed in claim 2, wherein a mass ratio (A/B) of the vinyl alcohol polymer (A) to the vinyl alcohol polymer (B) is 10/90 to 55/45.

4. A method for producing a vinyl resin, comprising suspension-polymerizing a vinyl compound in the presence of the dispersion stabilizer as claimed in claim 1.

5. The method for producing a vinyl resin as claimed in claim 4, wherein a polymerization temperature is 56° C. or higher.

6. The method for producing a vinyl resin as claimed in claim 4, wherein a mass ratio of a vinyl compound to water (vinyl compound/water) is 4/7 or more.

\* \* \* \* \*